(12) United States Patent
Al Tamimi

(10) Patent No.: US 11,902,007 B2
(45) Date of Patent: Feb. 13, 2024

(54) UAV-SUPPORTED MOBILE COMMUNICATIONS NETWORK

(71) Applicant: DISH Wireless L.L.C., Englewood, CO (US)

(72) Inventor: Mustafa Al Tamimi, Castle Pines, CO (US)

(73) Assignee: DISH Wireless L.L.C., Englewood, CO (US)

( * ) Notice: Subject to any disclaimer, the term of this patent is extended or adjusted under 35 U.S.C. 154(b) by 168 days.

(21) Appl. No.: 17/409,322

(22) Filed: Aug. 23, 2021

(65) Prior Publication Data
US 2023/0069579 A1    Mar. 2, 2023

(51) Int. Cl.
H04W 84/06    (2009.01)
H04B 7/185    (2006.01)
H04W 16/26    (2009.01)
H04W 16/18    (2009.01)

(52) U.S. Cl.
CPC ..... H04B 7/18504 (2013.01); H04B 7/18508 (2013.01); H04W 16/18 (2013.01); H04W 16/26 (2013.01)

(58) Field of Classification Search
CPC .. H04B 7/18502–18508; H04W 16/26; H04W 28/0231–0236; H04W 28/06; H04W 84/06; H04W 88/04
See application file for complete search history.

(56) References Cited

U.S. PATENT DOCUMENTS

2006/0074557 A1* 4/2006 Mulligan ............. G05D 1/0094
701/13
2020/0265726 A1* 8/2020 Dupray .............. H04B 7/18504

FOREIGN PATENT DOCUMENTS

WO    2018112091 A1    6/2018

OTHER PUBLICATIONS

W. Lee, R. Panda, D. Sunwoo, J. Joao, A. Gerstlauer and L. K. John, "BUQS: Battery- and user-aware QoS scaling for interactive mobile devices," 2018 23rd Asia and South Pacific Design Automation Conference (ASP-DAC), Jeju, Korea (South), 2018, pp. 64-69, doi: 10.1109/ASPDAC.2018.8297284. (Year: 2018).*
Federal Aviation Administration (FAA), "Summary of small unmanned aircraft rule (part 107)," Jun. 2016, 3 page.
Chandrasekharan et al., "Designing and Implementing Future Aerial Communication Networks," *IEEE Communications Magazine*:26-34, May 2016.

(Continued)

*Primary Examiner* — Ronald Eisner
(74) *Attorney, Agent, or Firm* — Seed IP Law Group, LLP

(57) ABSTRACT

A facility operates with respect to a configuration of one or more unmanned aerial vehicles operating as relays between on or more wireless network participant devices and one or more wireless base stations being supported directly or indirectly by a planetary surface. The facility conducts an experiment that yields quality of service results and flight duration results for each of multiple values of a UAV control parameter. The facility selects a value of the UAV control parameter that produced an advantageous tradeoff of quality of service results and flight duration results, and stores the selected value, such that the stored value of the UAV control parameter is usable to operate the UAVs of the configuration in production service.

16 Claims, 8 Drawing Sheets

(56) References Cited

OTHER PUBLICATIONS

First Prime Air Delivery URL = https://www.amazon.com/AmazonPrimeAir/b?node=8037720011, Dec. 7, 2016, download date Dec. 14, 2017.
Federal Aviation Administration (FAA), "UAS traffic management research transition team plan," technical report, Jan. 2017, 24 pages.
Fierce Wireless, "Ericsson, China Mobile test drone on path to 5G," retrieved from http://www.fiercewireless.com/europe/ericsson-china-mobiletest-drone-path-to-5g, accessed on Dec. 14, 2017, Aug. 2016, 4 pages.
Unmanned Systems Technology, "KDDI and Terra Drone Announce new 4G LTE drone control network," Apr. 2017, retrieved from https://www.unmannedsystemstechnology.com/2017/04/kddi-terra-drone-announce-new-4g-lte-drone-controlnetwork/, 12 pages.
3GPP TSG RAN Meeting #75, RP-170779, "Study on enhanced LTE support for aerial vehicles," NTT DOCOMO, Ericsson, Mar. 2017, 13 pages.
3GPP TR 38.901, "Study on channel model for frequencies from 0.5 to 100 GHz," 2017, 95 pages.
3GPP TSG-RAN Meeting #78, 3GPP TR 36.777, "Study on Enhanced LTE Support for Aerial Vehicles," Dec. 2017, 154 pages.
3GPP TSG RAN Meeting #75, 3GPP RP-170717, "Study on NR to support non-terrestrial Networks," Thales, DISH Network, Mar. 2017, 5 pages.
"Drones need cellular networks for full-service autonomous operations and UTM"—Gutma Connected Skies Webinar URL = https://www.unmannedairspace.info/uncategorized/drones-need-cellular-networks-for-full-service-autonomous-operations-and-utm-gutma-connected-skies-webinar/, Mar. 27, 2020, download date May 14, 2021.
Daley, "Fighting Fires and Saving Elephants: How 12 Companies are Using the AI Drone to Solve Big Problems," URL = https://builtin.com/artificial-intelligence/drones-ai-companies, Mar. 25, 2020, download date May 10, 2021.
Bisen "How AI Based Drone Works: Artificial Intelligence Drone Use Cases," URL = https://medium.com/vsinghbisen/how-ai-based-drone-works-artificial intelligence-drone-use-cases-7f3d44b8abe3, Feb. 5, 2020, download date May 14, 2021.
Sbeglia, "Airbus and MI to conduct 5G SA network trials for UAVs," URL = https://www.rcrwireless.com/20200615/carriers/airbus-m1-5g-sa-trials-uavs, Jun. 15, 2020, download date May 14, 2021.
Aljehani et al., "Performance Evaluation of Multi-UAV System in Post-Disaster Application: Validated by HITL Simulator," IEEE Access 7: 64386-64400, May 2019.
Chandrasekharan et al., "Designing and Implementing Future Aerial Communication Networks," *IEEE Communications Magazine* 54(5): 26-34, May 2016.
International Search Report and Written Opinion, dated Nov. 29, 2023, for International Application No. PCT/US2022/041056. (18 pages).
Vinogradov et al., "Tutorial on UAVs: A Blue Sky View on Wireless Communication," arXiv.org, Jan. 2019. (43 pages).

* cited by examiner

UAV-SUPPORTED MOBILE COMMUNICATIONS NETWORK

BACKGROUND

Mobile networks exchange data—often including telephony data and non-telephony data—among mobile devices such as smartphones, and between mobile devices and computing and/or telephony devices whose locations are fixed.

It is typical for a mobile network to include a number of geographically-distributed, fixed-location radio base stations, each of which service a limited surrounding geographic area, often called a "cell." Base stations are connected directly to each other, and/or to switched, fixed network that can exchange data among the base stations, and between any base station and the public switched telephone network, independent computing devices in arbitrary locations, etc. Base stations typically have a permanent, reliable, and secure supply of the energy they need to operate, as a result of being hard-wired to local electrical utilities, and/or having dedicated means of energy generation and/or storage.

A mobile device uses the network by making a radio connection to the nearest radio base station, or the radio base station to which the strongest radio signal can be transmitted—if a clear communications path to the nearest radio base station is not available, it is typical for the mobile device to connect to a radio base station further away. The radio connection between the mobile device and the base station can be used to exchange data between the mobile device and the base station. As the mobile device is carried to new locations, the choice of base stations is repeatedly reevaluated, such that the mobile device can switch to communicating with a new base station when the mobile device's movement renders the new base station the one to which the mobile device can transmit or receive the strongest radio signal, the one that has adequate capacity to support the mobile device's communications, the one that has the cheapest marginal cost to use, etc.

A variety of categories of data can be exchanged by mobile communications networks, including either or both ends of an emergency or disaster-relief call, associated data, etc.

DETAILED DESCRIPTION

Figure 1:
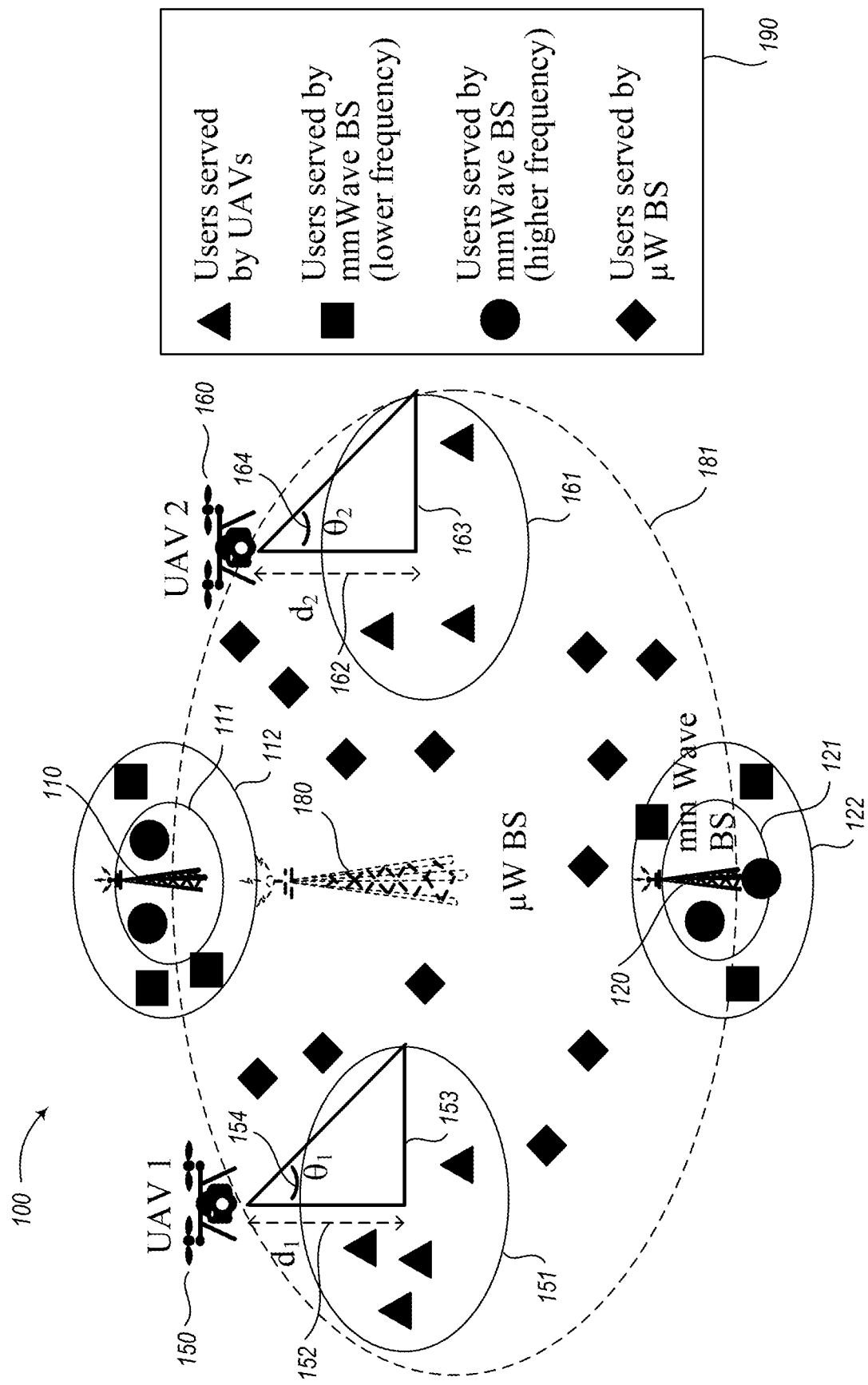
FIG. 1 is a network configuration diagram showing a network configuration operated by the facility in some embodiments.

The inventors have recognized significant vulnerabilities of mobile networks that rely exclusively on fixed-location base stations. In particular, such fixed-location base stations can be destroyed or disabled by natural disasters, human conflicts, or intentional sabotage. Also, apparatus that is part of a fixed-location base station on which the base station relies to continue to operate may fail. In each of these cases, it may take hours, days, or even months to return the base station to operation by repairing or replacing it. This can make it difficult or impossible to use the wireless network from one or more cells, particularly in cases where a systemic problem simultaneously disables multiple adjacent cells. Even where connections can be made, there may be a lowered ceiling on number of simultaneous connections, and/or reduced quality of service for individual connections.

To overcome these vulnerabilities of conventional wireless networks that rely exclusively on fixed-location base stations, the inventors have conceived and reduced to practice a software and/or hardware facility for substituting unmanned aerial vehicles ("UAVs") for fixed-location base stations in a wireless network, such as a 5G wireless network ("the facility"). In some embodiments, the facility temporarily substitutes UAVs for fixed-location base stations, such as fixed-location base stations that are in the process of placement, repair or other service, or replacement. In some embodiments, the facility permanently substitutes UAVs for fixed-location base stations, such as in geographic areas where the terrain makes placement of fixed-location base stations difficult; where the property or regulatory rights to place or operate a fixed-location base station are not available or are prohibitively expensive; etc. In some embodiments, the facility permits the substitution to be made and operating in a short period of time, such as a period measured in minutes or hours.

The facility directs each of its in-service UAVs to fly in a single position (for UAV types capable of maintaining a single position) or path well-suited to serving mobile devices on or near the ground in a "UAV cell" region. In various embodiments, UAV cells are the same size, larger, or smaller than fixed base station cells. In some embodiments, UAVs are the deployed before base stations in particular regions, and thus "substitute for" fixed base stations only in a prospective way. In some embodiments, each UAV relays traffic between mobile devices in or near its UAV cell and nearby fixed-location base stations, which go on to route traffic received wirelessly in wired or other networks. In some embodiments, connections with certain mobile devices can be relayed through two or more UAVs in order to further reduce dependency on fixed-location base stations.

The facility automatically chooses flight altitude, beamwidth angle, and/or UAV cell area in a way that achieves a beneficial balance of quality of service with UAV power consumption—and, correspondingly, flight duration. In some embodiments, the facility schedules a rotation of UAV flights for each UAV cell, which in some cases is based on projected energy consumption by each UAV. In some embodiments, the flight schedules generated by the facility are dynamic (i.e., are changed by the facility in the course of a flight), based on factors such as projected energy consumption based upon in-progress flight alterations, and/or actual energy consumption.

In some embodiments, the facility modulates flight altitude—and, in some cases, UAV cell area and/or beamwidth angle—in response to changes in weather, such as by reducing flight altitude in inclement weather in which the power of radio transmissions is likely to be attenuated. In some embodiments, the facility modulates flight altitude and/or path in order to avoid low-pressure zones likely to stall the UAV's flight.

By performing in some or all of the ways discussed above, in a relatively short amount of time, the facility overcomes outages or limitations of service in a wireless network that would otherwise result from the failure of fixed base stations, or the inability to establish them.

Also, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with less latency, and/or preserving more of the conserved resources for use in performing other tasks or additional instances of the same task. For example, by interposing UAVs between base stations and mobile devices served by the wireless network, the facility permits base stations to be sited in locations that are easier or cheaper to procure, easier to reach with delivered energy, wired networks, and/or construction or maintenance personnel, etc. Also, by optimizing the energy use of UAVs, the facility enables them to support higher levels of quality of service more consistently, and/or operate at a lower power consumption rate, for longer periods of time.

FIG. 1 is a network configuration diagram showing a network configuration operated by the facility in some embodiments. The key 190 characterizes the different-shaped symbols used to identify network participants, or "users," served by different elements of the network in diagram 100. As shown, two UAVs 150 and 160 operate in the network. UAV 150, for example, flies at an altitude $d_1$ 152; configures its ground-facing radio to operate with a beamwidth angle $\theta_1$ 154, establishing a UAV cell 151 having a radius 153. UAV 160 has similar operating parameters. The user shown as triangles within UAV cell 151 exchange data with millimeter wave base station 110 or 120 via relay by UAV 150. Millimeter wave base stations 110 and 120 each establish their own base station cells (e.g., base station cells 111 and 112 surrounding base station 110). In some embodiments, users shown as circles inside base station cell 111 communicate with base station 110 via higher frequency (73 gigahertz) millimeter wave communications, while users shown as squares within base station cell 112 communicate with base station 110 using lower frequency (28 gigahertz) millimeter wave communication. In some embodiments, an optional microwave base station 180 operates a significantly larger base station cell 181 to serve users not in the UAV cells nor any of the smaller base station cells. In some embodiments, the facility deploys a larger number of UAVs, and/or circulates the UAVs that it deploys, to service these diamond-shaped users in situations where the microwave base station is not present or not operating.

Figure 2:
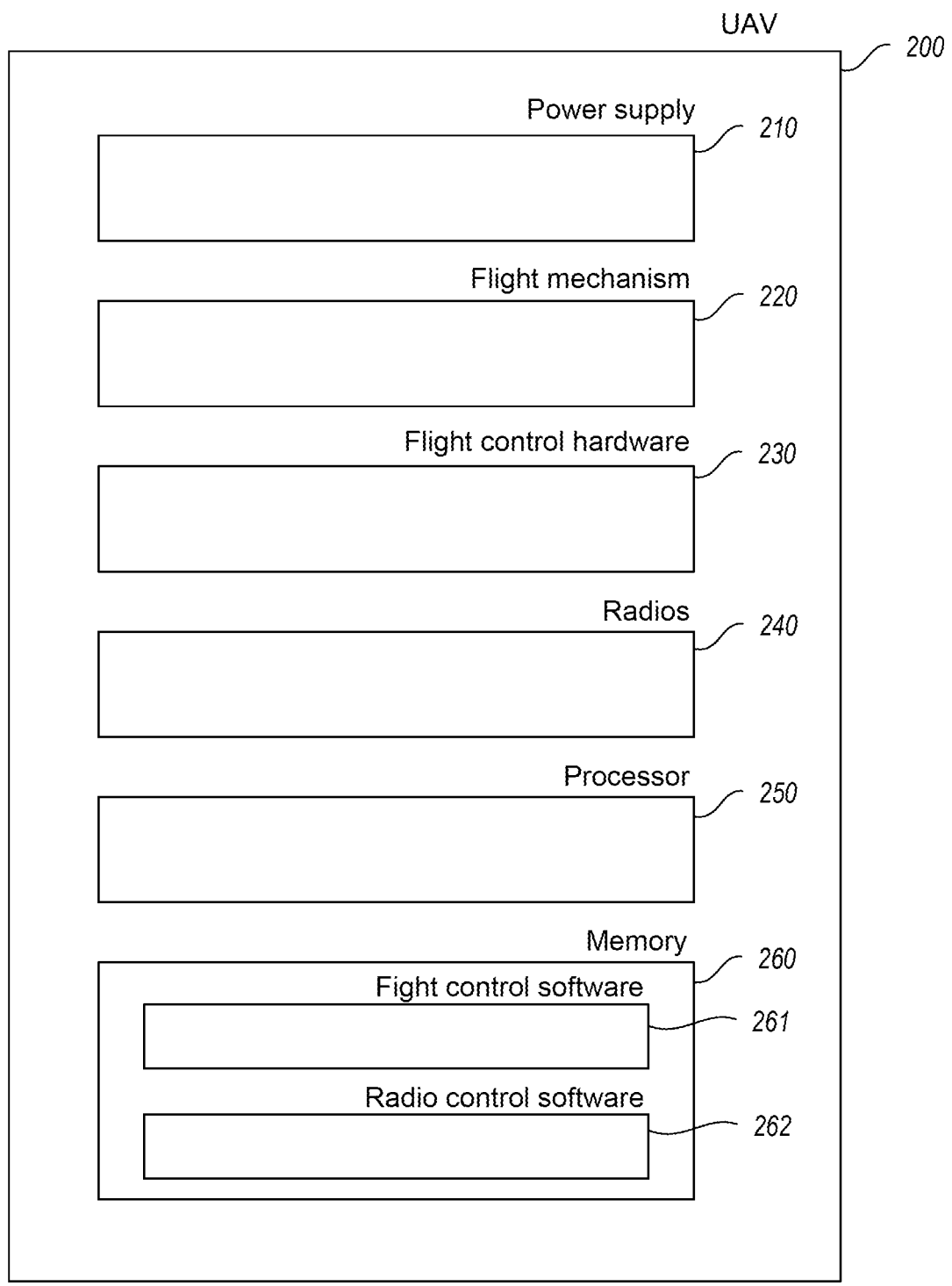
FIG. 2 is a block diagram showing some of the components typically incorporated in at least some of the UAVs employed by the facility.

FIG. 2 is a block diagram showing some of the components typically incorporated in at least some of the UAVs employed by the facility. In various embodiments, the facility uses UAVs that include the V-BAT 128, V-BAT 118, or eV-BAT from Martin UAV. In various embodiments, the facility uses UAVs of a variety of types, including those whose flight is powered by stored electricity, electricity generated from solar cells, fuel cells, fossil fuels, etc. In some embodiments, the UAV has a power supply 210 for storing electrical energy; a flight mechanism 220 for producing and maintaining flight, such as rotors, propellers, wings, jets, air jet thrusters, etc.; flight control hardware 230 such as rudders, flaps, ailerons, rotation stabilization rotors, etc.; radios 240 for communicating with network participant devices—such as those on the ground—and base stations or other UAVs; one or more processors 250; memory 260, having contents that include flight control software 261, as well as radio control software 262. While UAVs configured as described above are typically used to support the operation of the facility, those skilled in the art will appreciate that the facility may be implemented using UAVs of various types and configurations, and having various components.

Figure 3:
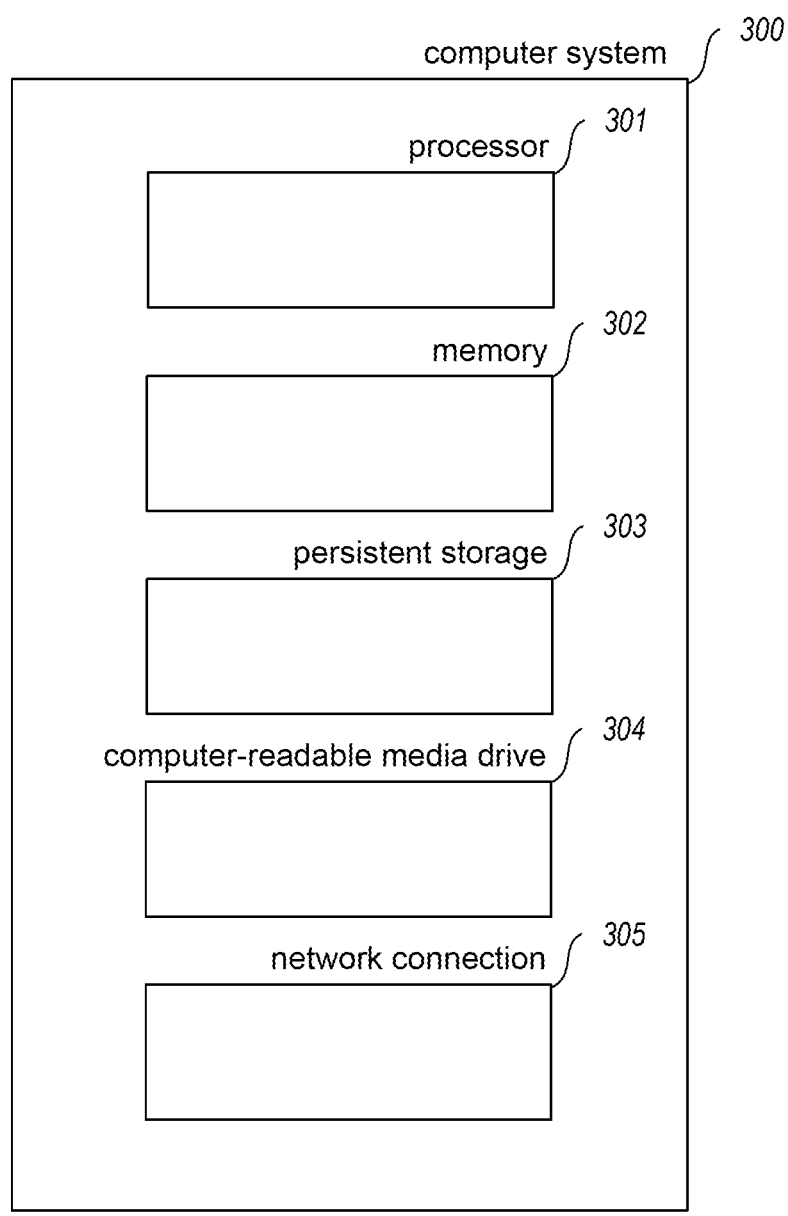
FIG. 3 is a block diagram showing some of the components typically incorporated in at least some of the computer systems and other devices on which the facility operates.

FIG. 3 is a block diagram showing some of the components typically incorporated in at least some of the computer systems and other devices on which the facility operates. In various embodiments, these computer systems and other devices 300 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 301 for executing computer programs and/or training or applying machine learning models, such as a CPU, GPU, TPU, NNP, FPGA, or ASIC; a computer memory 302 for storing programs and data while they are being used, including the facility and associated data, an operating system including a kernel, and device drivers; a persistent storage device 303, such as a hard drive or flash drive for persistently storing programs and data; a computer-readable media drive 304, such as a floppy, CD-ROM, or DVD drive, for reading programs and data stored on a computer-readable medium; and a network connection 305 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 4:
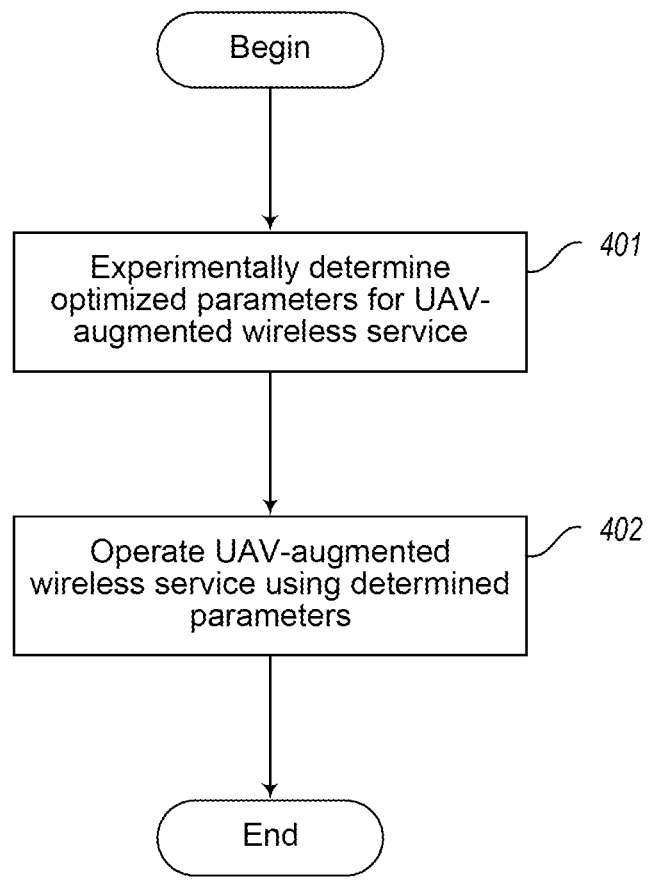
FIG. 4 is a flow diagram showing a process performed by the facility in some embodiments in order to operate a UAV-augmented wireless service using experimentally-determined parameters.

FIG. 4 is a flow diagram showing a process performed by the facility in some embodiments in order to operate a UAV-augmented wireless service using experimentally-determined parameters. In act 401, the facility experimentally determines optimized parameters for a UAV-augmented wireless service. For example, as described in greater detail below, in some embodiments, the facility performs practical experiments and/or simulation experiments as a basis for optimizing parameters such as flight altitude, beamwidth angle, and/or UAV cell area in a way that achieves a beneficial balance of quality of service for participant devices with energy consumption, particularly energy consumption by the UAVs that limits the length of flights that can be performed. In act 402, the facility uses the parameters determined in act 401 to operate a UAV-augmented wireless service. After act 402, this process concludes.

Those skilled in the art will appreciate that the acts shown in FIG. 4 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 6:
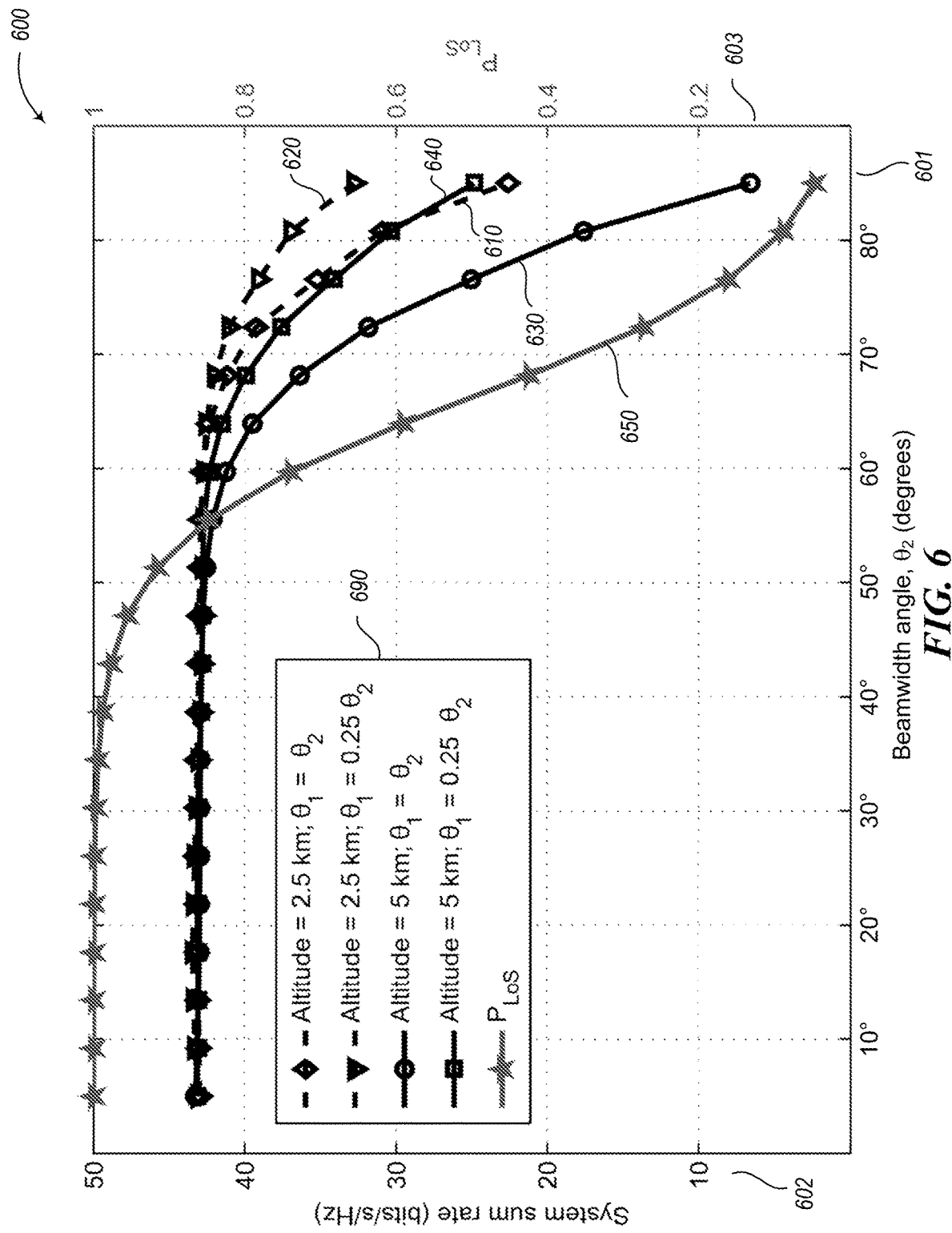
FIG. 6 is a graph diagram showing the effect of beamwidth angle on system sum rate and probability of line-of-sight connection.

In various embodiments, the facility performs the experiment with various numbers of participant devices, such as fifty. In some of the simulations, the facility randomly places each participant device at a location in the geographic area of the experiment. A number of UAVs to deploy—such as two—is determined, and their flight paths—including both altitude(s) and lateral position(s)—are defined. In some environments, they do not overlap. Each UAV has a beamwidth angle defining a downward-facing cone in which UAVs participant device radios communicate with participant devices. These beamwidth angles affect the system sum rate of total data throughput, as well as the probability of forming a line-of-sight communication link, as shown in FIG. 6 and discussed below. The angle of elevation can be defined as the difference between the right angle and the respective beamwidth angle of the UAV. The coverage radius of the UAV cell can be computed using law of triangles, using elevation angle and UAV altitude.

In some embodiments, the facility uses one or more power control strategies in its experimental and/or production networks. Each power control strategy assigns a power control tactic to each of the kinds of radios used by the facility: microwave base stations, small base stations operating at 28 gigahertz, small base stations operating at 73 gigahertz, and UAVs. Table 1 below shows the power control tactic used with each radio type as part of each power control strategy. These power control tactics are: maximum power—transmit at the highest possible power supported by the radio; rate maximization—transmit at the lowest power level that maximizes energy efficiency for participant devices, that is, volume of data sent per joule of energy expended; and power utilization—transmit at the lowest power level that satisfies quality of service requirements for users, such as target signal to interference plus noise ratio.

TABLE 1

| Power control strategy | Microwave base station | Small base station 28 GHz | Small base station 73 GHz | UAV |
|---|---|---|---|---|
| Benchmark | max power | rate maximization | rate maximization | power minimization |
| Approach 1 | rate maximization | rate maximization | rate maximization | power minimization |
| Approach 2 | power minimization | rate maximization | power minimization | power minimization |

In the Benchmark strategy, a microwave base station transmits at its maximum transmission power to maximize the achievable rate for participant devices. The small base station operating at 73 gigahertz is regarded as being in a noise limited situation. In Approach 1, participant devices connected to the microwave base station, and the small base station operating at 28 gigahertz are regarded as being in an interference-limited situation. In Approach 2, power minimization tactics are employed, which restrict the microwave base station and the small base station operating at 28 gigahertz to transmit at the minimum power levels needed to fulfill the participant device's minimum quality of service requirements; this reflects circumstances such as natural disasters and unexpected changes in traffic patterns. Due to their limited battery capacity, the UAVs operate in the power minimization mode for all of the strategies.

Figure 5:
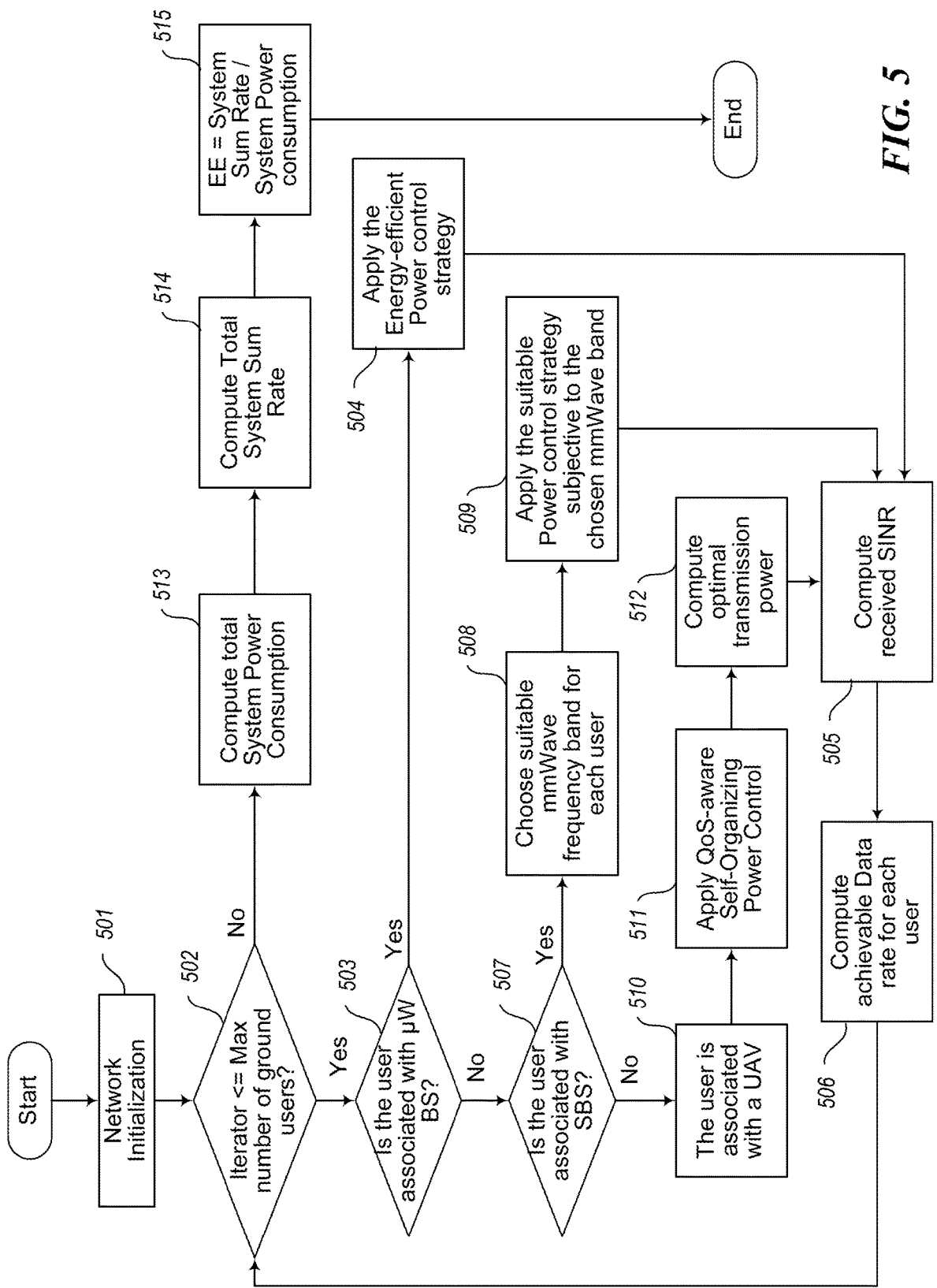
FIG. 5 is a flow diagram showing a process performed by the facility in some embodiments in order to perform a simulation experiment.

FIG. 5 is a flow diagram showing a process performed by the facility in some embodiments in order to perform a simulation experiment. In act 501, the facility initializes the simulation network. In act 502, if an iterator variable is less than a maximum number of participant devices, then the facility continues in act 503, else the facility continues in act 513. In act 503, if the current user is connected to a microwave base station, then the facility continues in act 504, else the facility continues in act 507. In act 504, the facility applies the energy-efficient power control strategy. After act 504, the facility continues in act 505. In act 505, the facility computes the signal to interference plus noise ratio ("SINR") of the signal received at the participant device. In act 506, the facility computes an achievable data rate for each participant device. After act 506, the facility continues in act 502.

In act 507, where the participant device is not connected to a microwave base station, if the participant device is connected to a small base station, then the facility continues in act 508, else the facility continues in act 510. In act 508, the facility choses a suitable millimeter wave frequency band for each participant device. In act 509, the facility applies the power control strategy chosen in act 508 subjective to the chosen millimeter waveband. After act 509, the facility continues in act 505.

In act 510, where the participant device is connected neither to a microwave base station nor to a small base station, the facility connects the participant device to a UAV. In act 511, the facility applies the quality of service-aware cell-organizing power control strategy. In act 512, the facility computes optimal transmission power. After act 512, the facility continues in act 505.

In act 513, where the iterator is not less than or equal to the maximum number of participant devices, the facility computes a total system power consumption. In act 514, the facility computes the total system sum rate representing the total bandwidth of network with all participate devices. In act 515, the facility calculates an energy efficiency metric that is equal to the system sum rate computed in act 514 divided by the system power consumption determined in act 513. The system energy efficiency can be regarded as the ratio of the sum of all the user data rates to the sum of the power consumed by all the user in the network. After act 515, this process concludes.

FIG. 6 is a graph diagram showing the effect of beamwidth angle on system sum rate and probability of line-of-sight connection. The graph 600 shows five trend lines 610, 620, 630, 640, and 650, each identified by key 690. Trend lines 610 and 620 relate to experiments where both drones are flown at an altitude of 2.5 kilometers, while trend lines 630 and 640 relate to experiments in which both drones are flown at an altitude of 5 kilometers. Trend lines 610 and 620 differ in that trend line 610 relates to an experiment where the beamwidth angle of the second UAV is the same as the beamwidth angle of the first UAV, while trend line 620 relates to an experiment where the beamwidth angle of the second UAV is one-quarter as large as the beamwidth angle of the first UAV. Trend lines 630 and 640 have a similar relationship. Vertical positions in trend lines 610, 620, 630, and 640 correspond to System Sum Rate vertical axis 602. Trend line 650 shows the probability of establishing a line-of-sight connection as beamwidth angle changes. Vertical positions in trend line 650 correspond to $P_{LoS}$ vertical axis 603. It can be observed that, beyond a certain value of beamwidth angle of the second UAV, all of the system sum rate curves exhibit a decreasing trend due to an increasing coverage radius, which causes greater attenuation in the communication links between the participant devices and the UAV. Reducing the beamwidth angle of the first UAV relative to the beamwidth angle of the second UAV results in a higher system sum rate in comparison to cases where the beamwidth angles are the same between UAVs. The inventor has concluded that this is the case due to the reduced coverage radius of the first UAV, which improves the capacity of the transmission links due to smaller path loss. It can be seen from the probability of line-of-sight connection curve 650 that larger beamwidth angles (i.e., smaller angles of elevation) result in a lower probability of line-of-sight connection, if all other parameters are fixed.

In some embodiments, the UAVs share spectrum with a microwave base station. In some embodiments, the facility uses a self-adaptive power control strategy for the UAVs in order to protect the quality of service of the users connected directly to the microwave base station. This scheme considers the following three power control modes for the UAVs: (1) minimum transmission power needed to satisfy the UAV's participant devices' minimum quality of service requirements; (2) a power level corresponding to the maximum allowable interference threshold that can be tolerated by the users directly connected to the microwave base station; and (3) maximum transmission power of the UAVs.

service guarantee. The graph 800 shows trend lines 810, 820, 830, 860, 870, and 880, identified by key 890. Trend lines 810, 820, and 830 are graphed against energy efficiency vertical axis 802, while trend lines 860, 870, and 880 are graphed against data throughput ("system sum rate") vertical axis 830. Trend lines 810 and 860 show these values for the Benchmark power control approach; trend lines 820 and 870 show these results for the Approach 1; and trend lines 830 and 880 show these results for Approach 2. It can be seen from curves 810 and 860 that the Benchmark approach is insensitive to target SINR, both with respect to energy efficiency and throughput, as it explicitly does not alter radio power level in response to target SINR. Curves 870 and 880 show that, for approaches 1 and 2, increases in target SINR increase data throughput. On the other hand, curves 820 and 830 show that, after a point at about 60 dB, Approaches 1 and 2 reduce energy efficiency as target SINR increases. This can be attributed to the fact that the increase in system sum rate is not commensurate with the increase of the power consumed by the network, because of the rising rate demands of the participant devices.

Table 2 below provides an overview of the achievable system energy efficiency versus target SINR for the three power control approaches discussed above.

TABLE 2

| $T$ [dB] | Approach 1 [b/J/Hz] | Approach 1 (no UAVs) [b/J/Hz] | Approach 2 [b/J/Hz] | Approach 2 (no UAVs) [b/J/Hz] | Benchmark approach [b/J/Hz] | Benchmark approach (no UAVs) [b/J/Hz] |
|---|---|---|---|---|---|---|
| 0 | 301.06 | 134.61 | 171.35 | 85.59 | 76.41 | 35.71 |
| 2.5 | 272.95 | 119.2219 | 166.07 | 78.50 | 76.41 | 35.71 |
| 5 | 240.55 | 103.39 | 158.03 | 70.10 | 76.41 | 35.71 |
| 7.5 | 206.51 | 85.83 | 143.75 | 62.2 | 76.41 | 35.71 |
| 10 | 175.46 | 72.06 | 131.69 | 55.22 | 76.41 | 35.71 |
| 15 | 133.65 | 56.25 | 112.87 | 47.08 | 76.41 | 35.71 |
| 20 | 110.07 | 47.14 | 101.73 | 42.24 | 76.41 | 35.71 |

In some embodiments, the facility selects for each UAV the one of these three power modes that yields the lowest power level.

Figure 7:
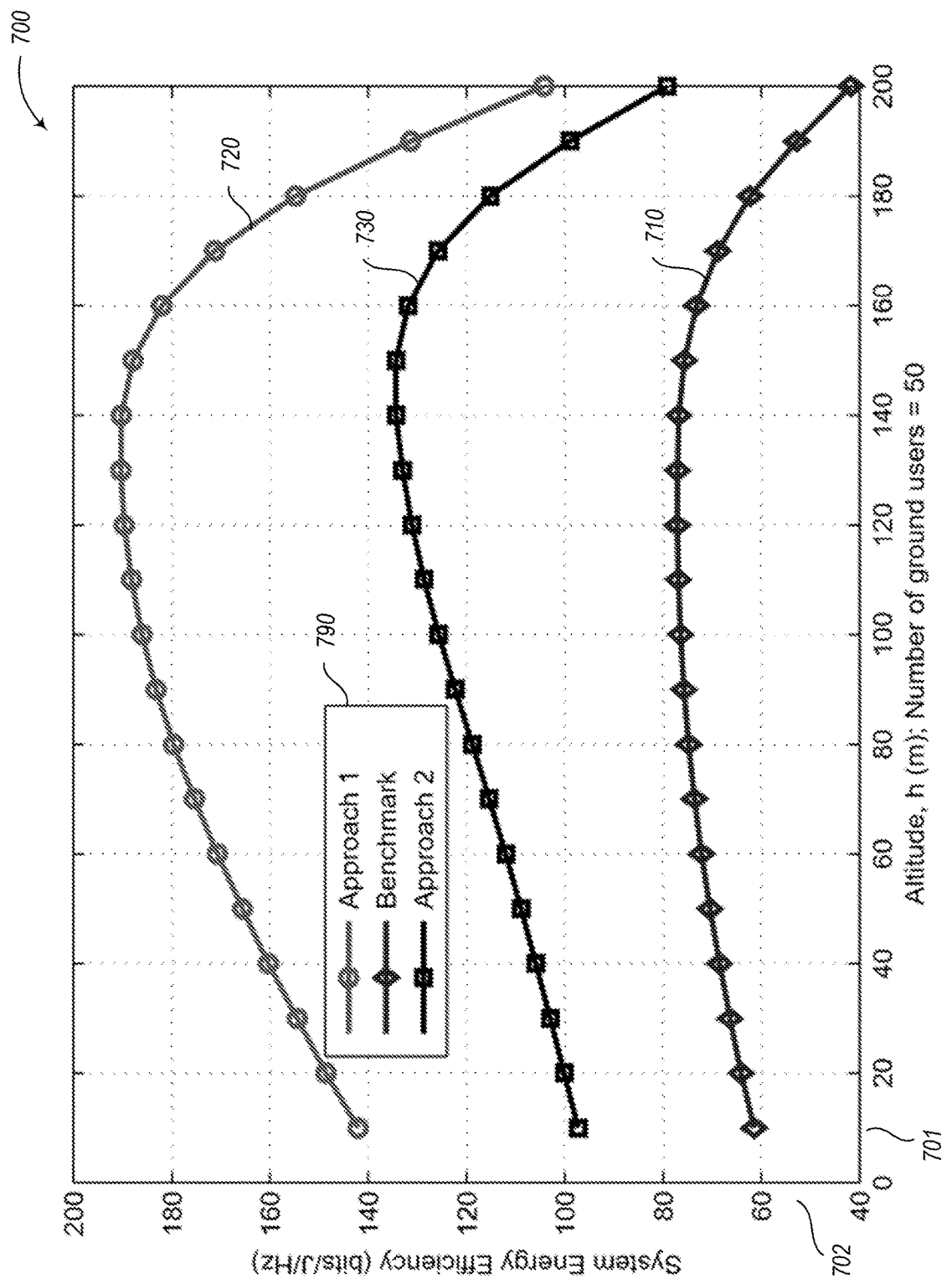
FIG. 7 is a graph diagram showing the results of experiments evaluating the affect of altitude on energy efficiency.

FIG. 7 is a graph diagram showing the results of experiments evaluating the affect of altitude on energy efficiency. Graph 700 shows three trend lines 710, 720, and 730, identified by key 790. Trend line 710 shows the experimental results for energy efficiency at a range of altitudes employing the Benchmark power control approach. Trend line 720 shows the energy efficiency levels that result from different altitudes when employing Approach 1, and trend line 730 shows the energy efficiencies that result from different altitudes when employing Approach 2. The graph shows that Approach 1 outperforms Approach 2 in the Benchmark scheme and maximizes energy efficiency. It can also be seen that energy efficiency reaches a maximum value when UAV altitude is near 140 meters. In fact, at altitude 140 meters, energy efficiency is 35% greater than at altitude 10 meters. At higher altitudes, while probability of line-of-sight connection increases, the path loss also increases due to the increasing distance between UAVs and the participant devices on the ground. Since optimal energy efficiency is achieved at approximately 140 meters for all of the power control strategies, a tradeoff exists between energy efficiency and UAV altitude at this point. Subsequent simulations were therefore conducted at an altitude of 140 meters for a fair comparison.

Figure 8:
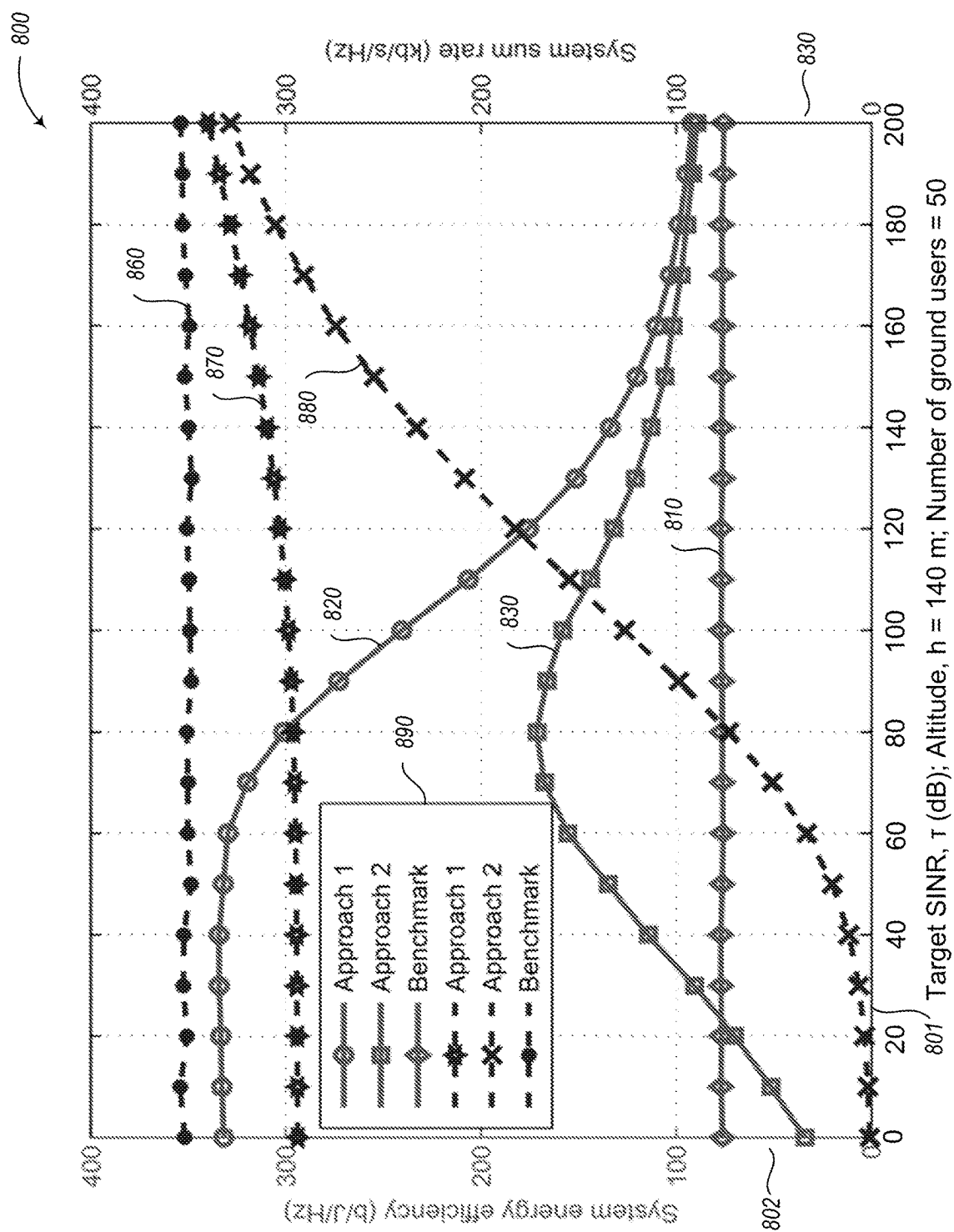
FIG. 8 is a graph diagram showing increasing target signal to interference plus noise ratio, one form of quality-of-service guarantee.

FIG. 8 is a graph diagram showing increasing target signal to interference plus noise ratio, one form of quality-of- Table 2 shows an energy efficiency gain of more than 100% for each of the three power control approaches when UAVs are used, which recommends their use.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wireless network, comprising:
   one or more stationary radio base stations, each base station being supported directly or indirectly by a planetary surface, and comprising:
   one or more radios configured to transmit and receive data wirelessly, and a radio connection to a terrestrial network configured to convey data to other points supported directly or indirectly by the planetary surface; and one or more unmanned aerial vehicles (UAVs), each UAV comprising:

flight control hardware configured to induce flight of the UAV through a series of three-dimensional positions each characterized by an altitude and a lateral location, one or more radios configured to (1) transmit and receive data wirelessly with radios of at least one network participant device, and (2) transmit and receive data wirelessly with at least one radio of at least one base station, a router configured to use the radios to relay data wirelessly between the network participant devices and the at least one base station, an energy storage system configured to provide energy to the one or more radios, a memory storing values for each of at least one UAV control parameter, the stored control parameter values selected to produce a desirable tradeoff between a quality of service level that can be achieved for network participant devices and an amount of time for which the UAV can remain in service, and a control system, comprising a processor, configured to control the UAV in accordance with the control parameters stored by the memory.

2. The wireless network of claim 1, further comprising: one or more network participant devices, each comprising one or more radios configured to transmit and receive data wirelessly with radios of at least one UAV.

3. The wireless network of claim 2, wherein a selected one of the network participant devices further comprises a battery configured to store energy for powering the one or more radios of the selected network participant device.

4. The wireless network of claim 2, wherein a selected one of the network participant devices further comprises a connection to utility power configured to convey energy for powering the one or more radios of the selected network participant device.

5. The wireless network of claim 1, wherein the UAV control parameters for which the memory stores values comprise a flight elevation control parameter.

6. The wireless network of claim 5, wherein the flight elevation control parameter value stored by the memory is approximately 140 m.

7. The wireless network of claim 5, wherein the flight elevation control parameter value stored by the memory is between 130 m and 150 m.

8. The wireless network of claim 1, wherein the UAV control parameters for which the memory stores values comprise a flight lateral path shape control parameter.

9. The wireless network of claim 1, wherein the UAV control parameters for which the memory stores values comprise a radio beamwidth angle control parameter.

10. The wireless network of claim 1, wherein the UAV control parameters for which the memory stores values comprise a UAV cell area control parameter or a UAV cell radius control parameter.

11. The wireless network of claim 1, wherein the UAV control parameters for which the memory stores values comprise a broadcast power level control parameter.

12. An unmanned aerial vehicle (UAV), comprising:

flight control hardware configured to induce flight of the UAV through a series of three-dimensional positions each characterized by an altitude and a lateral location;

one or more radios configured to (1) transmit and receive data wirelessly with radios of at least one network participant device, and (2) transmit and receive data wirelessly with at least one radio of at least one base station supported directly or indirectly by a planetary surface;

a router configured to use the radios to relay data wirelessly between the network participant devices and the at least one base station;

an energy storage system configured to provide energy to the one or more radios;

a memory storing values for each of at least one UAV control parameter, the stored control parameter values selected to produce a desirable tradeoff between a quality of service level that can be achieved for network participant devices and an amount of time for which the UAV can remain in service; and a control system, comprising a processor, configured to control the UAV in accordance with the control parameters stored by the memory.

13. The UAV of claim 12, wherein the memory stores a value of a flight elevation control parameter value approximately equal to 140 m.

14. The UAV of claim 12, wherein the memory stores a value of a radio beamwidth angle control parameter.

15. The UAV of claim 12, wherein the memory stores a value of a UAV cell area control parameter or a UAV cell radius control parameter.

16. The UAV of claim 12, wherein the memory stores a value of a broadcast power level control parameter.

* * * * *